July 11, 1961 W. M. HAESSLER ET AL 2,991,658
CONTROL DEVICE
Filed Jan. 10, 1958 4 Sheets-Sheet 1
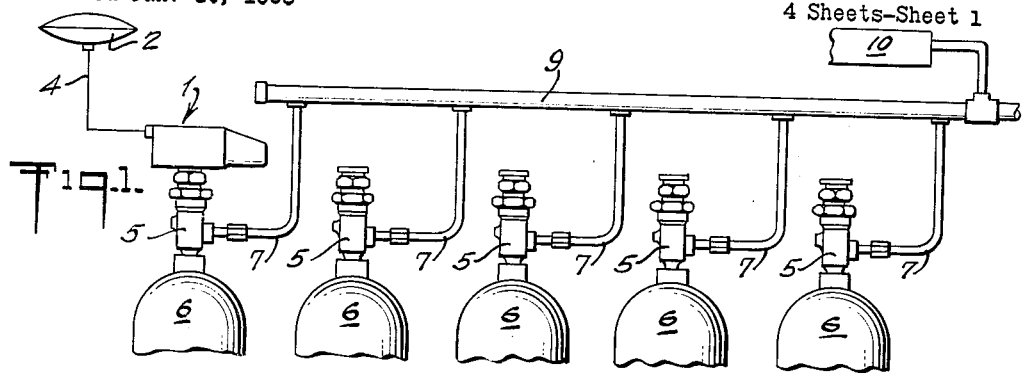
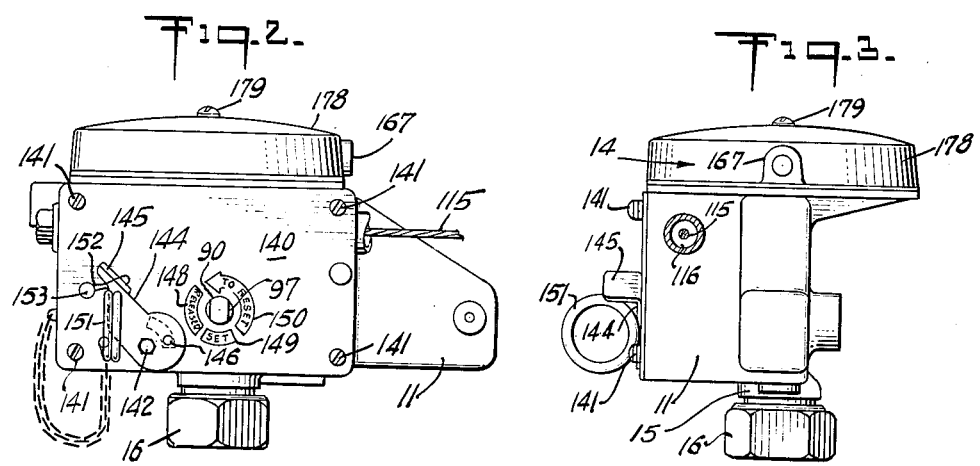
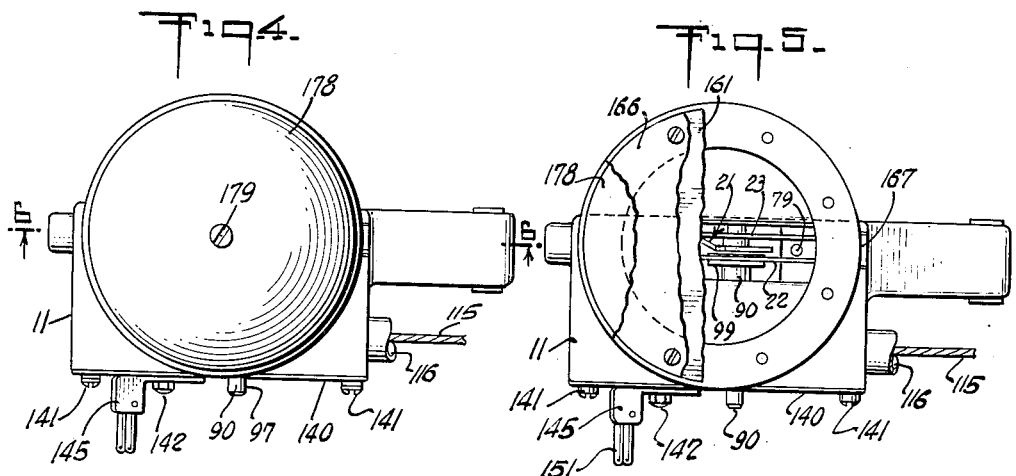
INVENTORS
BENJAMIN WENDROFF
WALTER M. HAESSLER
BY
Edward V. Connors
ATTORNEY

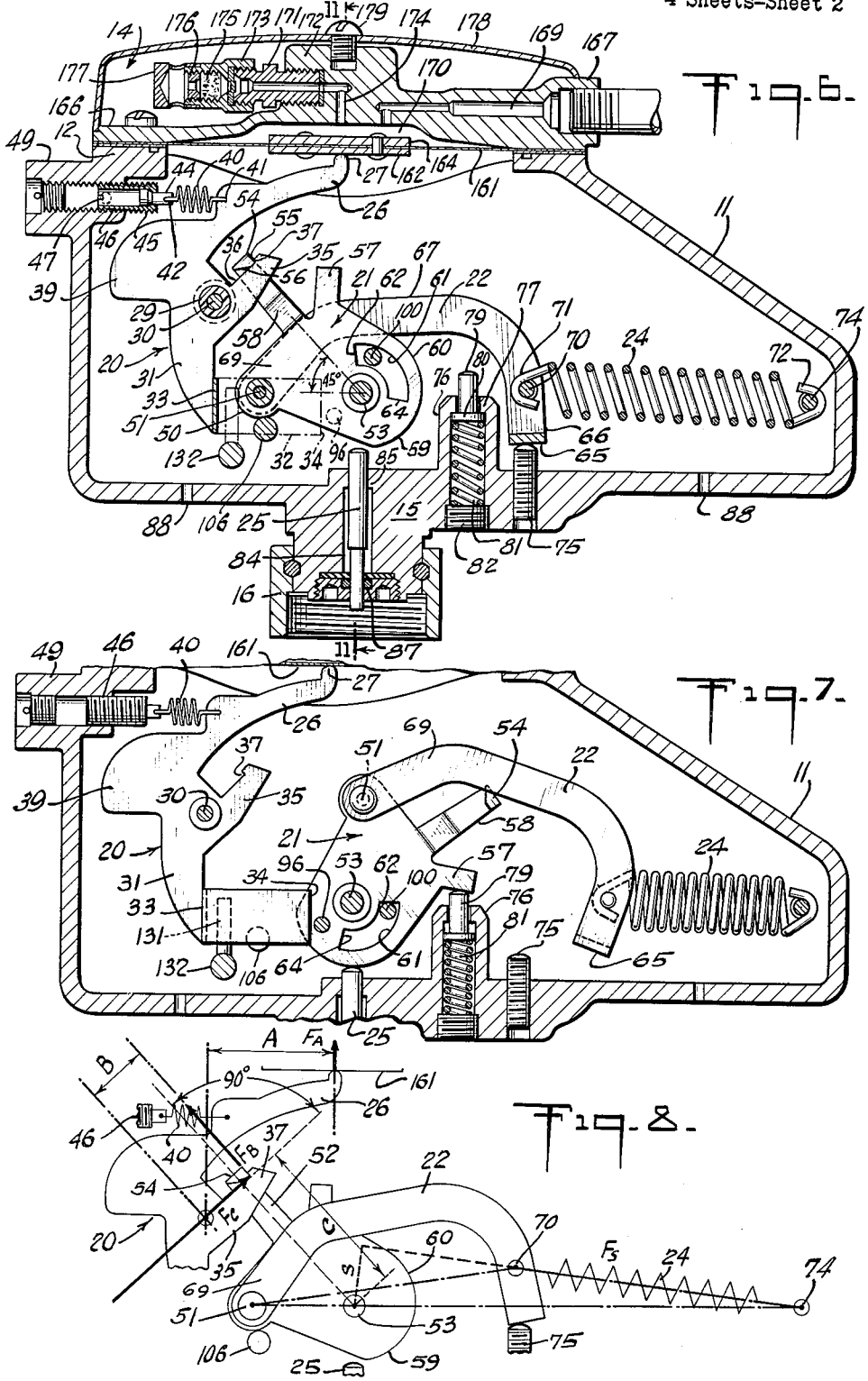

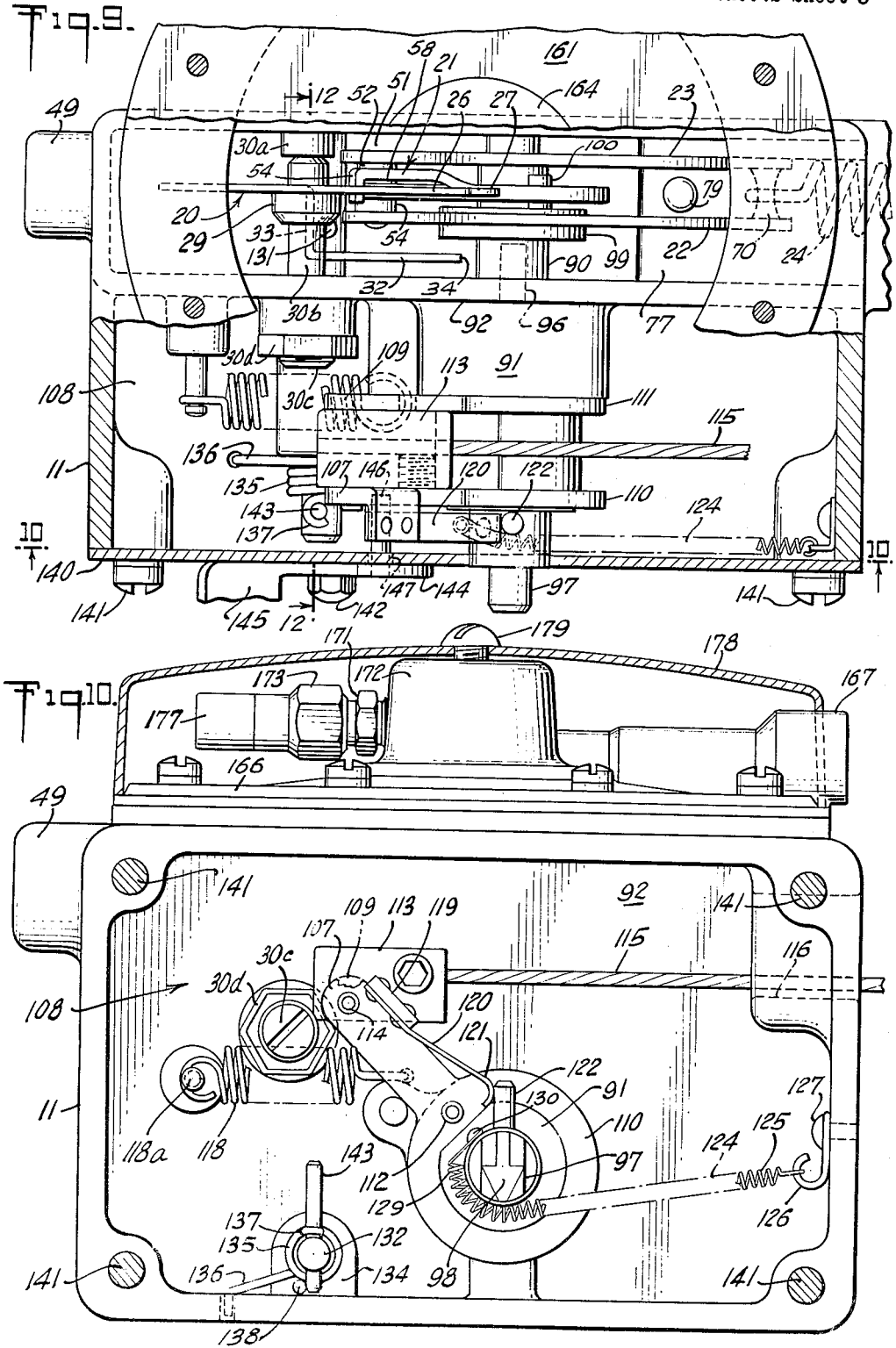

July 11, 1961  W. M. HAESSLER ET AL  2,991,658
CONTROL DEVICE
Filed Jan. 10, 1958  4 Sheets-Sheet 4

INVENTORS
BENJAMIN WENDROFF
WALTER M. HAESSLER
BY
Edward V. Connors
ATTORNEY

United States Patent Office 2,991,658
Patented July 11, 1961

2,991,658
CONTROL DEVICE
Walter M. Haessler, Chatham, and Benjamin Wendroff, Lake Hiawatha, N.J., assignors to The Fyr-Fyter Company, Dayton, Ohio
Filed Jan. 10, 1958, Ser. No. 708,178
12 Claims. (Cl. 74—2)

The present invention relates to control devices, and particularly to a control device which may be actuated by a small force to operate a valve controlling a high pressure medium.

While the control device in accordance with the present invention may be used for other purposes, it is particularly suitable for use in a fire extinguishing system of the "rate-of-rise" type in which a rapid increase in pressure is used to actuate the control device.

The rate-of-rise system incorporates a closed thin-walled chamber placed above a hazard to be protected from fire. The chamber is connected by tubing to the control device which is attached to a valve on a container of fire extinguishing agent. The system, including the chamber, is provided with a vent so that under normal temperature variations the chamber pressure is balanced with the atmospheric pressure by passage of air through the vent. However, under conditions, such as a fire, providing a rapid rise in the ambient temperature, the air in the thin-walled chamber is expanded more rapidly than it is vented and a pressure increase is had which is used to expand a bellows-type device providing mechanical movement to actuate a trigger member of the control device.

In order to keep the size and cost of the chamber and its piping as low as possible, the chamber is made quite small and the available pressure is of the order of one-half inch of water to several times this amount, and the trigger member must be responsive to this low pressure. The valve for the fire extinguishing agent may be pressure seated by pressures from one thousand to perhaps three thousand pounds. It will thus be understood that the control device itself must provide stored energy releasable by its trigger to open the valve.

Prior devices such as shown in United States Patents Nos. 2,333,130 and 2,466,750 have been made to accomplish the purpose of the present invention, but the construction of such devices differs considerably from that of the present device.

The present invention provides an improved structure requiring low resetting effort, yet produces a desired high operating force for opening a high pressure valve. This is accomplished by a mechanism which transforms static energy into kinetic energy utilized to produce an impulse movement of the operating member to open the valve. In addition, a structure is provided which is exceptionally easily adjusted to provide peak performance even though its parts are made with considerable variations in tolerance as result from production manufacture.

The construction in accordance with the invention is advantageous in that it is easily operable by a small force which may be provided by stored or explosive pressure, or by mechanical means. The construction may be operated locally or from a remote location and is shockproof. An indicator to show the set or released position of the device is combined with resetting means, the indicator moving with the resetting means so that by a single operation the device is reset and indication had thereof.

Another object of the invention is to provide a control device which is simple and economical in manufacture, dependable in operation and durable in use.

Other objects and advantages of the invention will be apparent from the following description and from the accompanying drawings which show, by way of example, an embodiment of the invention.

In the drawings:

FIGURE 1 is a schematic view showing a control device in accordance with the invention installed in a rate-of-rise system for discharging a fire extinguishing agent.

FIGURE 2 is a side view of the control device.

FIGURE 3 is an end view of the control device.

FIGURE 4 is a top view of the control device.

FIGURE 5 is a top view of the control device corresponding to FIGURE 4 but with the pressure operating means removed and one-half of the diaphragm thereof shown broken away.

FIGURE 6 is a vertical sectional view taken along the line 6—6 of FIGURE 4 and showing the control device in set position.

FIGURE 7 is a fragmentary view corresponding to FIGURE 6 showing the control device in the tripped position.

FIGURE 8 is a schematic drawing showing forces in the control device.

FIGURE 9 is an enlarged top view of a portion of FIGURE 4 showing the operating mechanism.

FIGURE 10 is a corresponding enlarged side view of FIGURE 9 taken along the line 10—10 of FIGURE 9.

Figure 11:
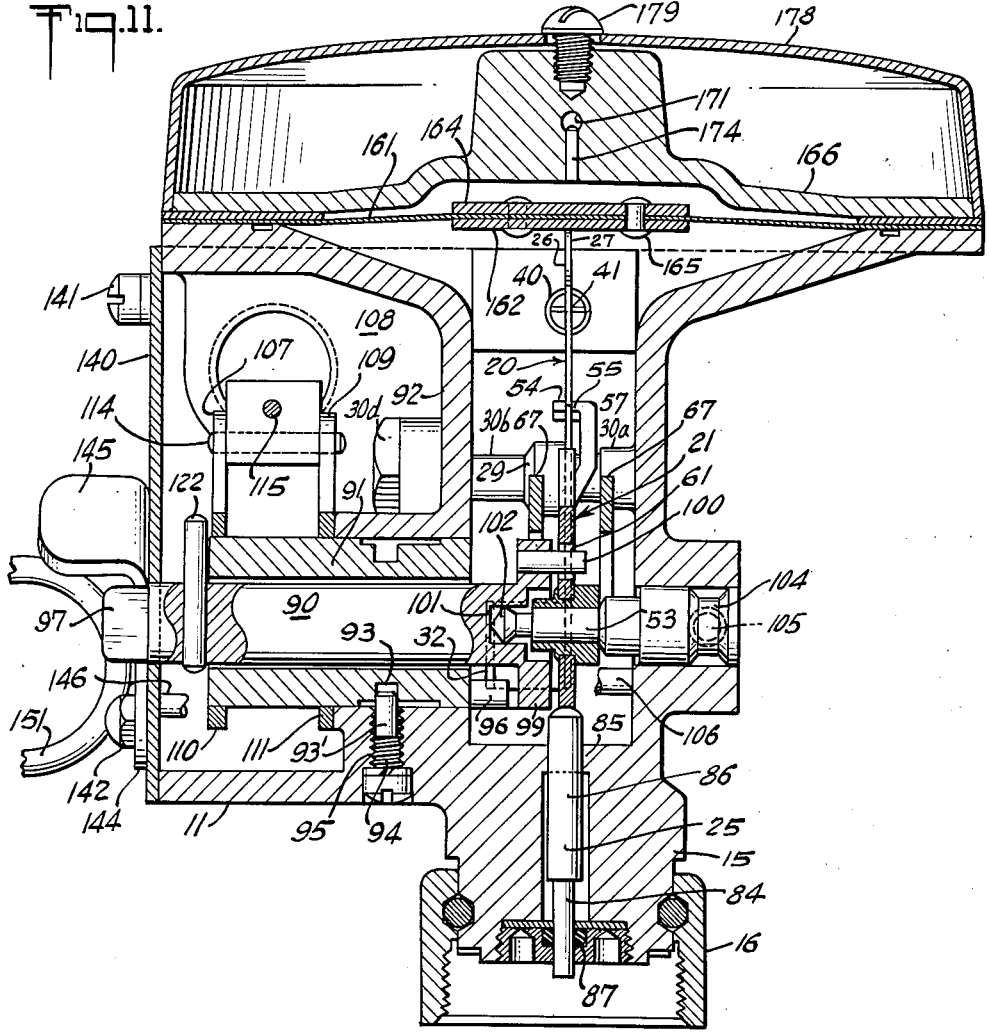
FIGURE 11 is an enlarged end view of the control device taken along the line 11—11 of FIGURE 6.

Referring to the drawings, there is shown in FIGURE 1 a schematic diagram illustrating the control device 1 in accordance with the invention incorporated in a rate-of-rise system, including a rate-of-rise actuator 2 connected to piping 4 which connects the rate-of-rise actuator with the control device 1. High pressure discharge valves 5 are positioned in the outlets of each of a plurality of high pressure fire extinguishing agent containers 6 and the control device 1 is attached to one of the discharge valves 5. The fire extinguishing agent containers 6 are connected by flexible pipes 7 to a discharge manifold 9 which may have attached thereto one or more conventional discharge heads 10.

The rate-of-rise actuator 2 is of the conventional type generally made of thin-walled metal and generally circular in shape as viewed from the top, and generally elliptical or oval in vertical cross section, thereby providing a large amount of surface area in proportion to the confined cubic space. The discharge valve 5 may be of any conventional type well known in the trade, in which a pilot valve may be utilized to control the opening of a main valve releasing the contents of the containers 6 into the discharge manifold 9, the pilot valve being actuated by the control device 1. Further, the discharge valve 5 may be provided with means by which the back pressure in the manifold 9 after one container is discharged therein, causes the other containers 6 to be automatically discharged. The discharge nozzle 10 may be one of a plurality of discharge heads located in any desired position within the space to be protected as is well known in the art.

The control device 1 includes a housing 11 having a top end 12 (FIG. 6) adapted to receive a conventional pressure actuated device 14. At the lower end of the housing 11 is a boss 15 to which is attached a swivel nut 16 which is suitable to be attached to the discharge valve 5.

The mechanism of the control device includes a trigger member 20 (FIG. 6) adapted to releasably secure a latching member 21 urged rotatively by a double yoke 22 and 23 (FIGS. 6 and 9) connected to a spring 24. Means, hereafter described, include manually operated and cable pull auxiliary operating means for the trigger 20. The trigger 20 is adapted to releasably engage the latching member 21 which, when released, acquires kinetic energy by its movement by the spring 24 and at a predetermined time suddenly moves operating member or rod 25 downwardly, the outer end of which is adapted to engage a pilot valve stem in a conventional manner to open the pilot valve.

The trigger member 20 is preferably made of Monel metal to stand salt water exposure although it may be made of any other suitable material and has an upwardly extending arm 26 (FIG. 6) having a rounded end 27 to be engaged by a part of the pressure actuating means 14 described later. The trigger member 20 is apertured and provided with a Nylon bushing 29 pivotally mounting the trigger member 20 on a shaft 30. The trigger member 20 has a downwardly directed part 31 having an offset portion 32 (FIG. 11), the offset portion being attached to the extension 31 by a right angled portion 33 (FIG. 6) forming a shoulder to be engaged by manual operating means described later. At the extreme outer end of the offset portion 32 is a vertical surface 34 (FIGS. 6, 7, 9) to be engaged by cable pull means described later. Intermediate the arm 26 and the downwardly directed part 31 is a triggering extension 35 (FIG. 6), the upper edge 36 of which is inclined at an angle approximately 45° from the horizontal. Extending upwardly at a ninety degree angle from the upper edge 36 of the triggering extension 35 is a triggering tip 37.

In order to balance the trigger 20 so as to make it shock-proof, a counter balance 39 (FIG. 6) is provided on the opposite side of the pivot shaft 30 from the triggering extension 35. The pivot shaft 30 supports the Nylon bushing 29 free to rotate on the shaft 30. The ends of the shaft 30 are free to rotate in a bushing member 30a at one end, and in a bushing member 30b at the other end. The inner end of the bushing 30b is set to just touch the side of the Nylon bushing 29 by adjustment of its outer threaded end 30c, a lock nut 30d being provided to maintain the setting. In order to maintain the triggering member 20 so that it tends to rotate in the counterclockwise direction, a spring 40 (FIG. 6) is attached at one end 41 to the triggering member 20, other end 42 of the spring 40 is attached to a pin 44 received in lower end 45 of a pressure adjustment screw 46 having a slotted head 47 and threadedly engaged in a boss 49 of the housing 11.

The latching member 21 (FIG. 6) is provided with a flanged bushing 50 pivotally housed on a pin or shaft 51. A pair of spacer members 52 and 54 (FIG. 9) are positioned on each side of the latching member 21 so as to hold the parts of the double yoke 22 and 23 separated. The outer ends of the shaft 51 may be peened over to secure it in position. Extending upwardly from the latching member 21 at an angle of approximately 45° from the horizontal is a latching extension 58. The extension 58 (FIGS. 6 and 9) is offset from the body of the latching member to provide clearance from the triggering extension 35. The end of the latching extension 58 is turned at a 90° angle to provide a latch 54 (FIG. 6) the right hand side of which is parallel to the axis of the extension 52, as indicated at 55, while the other surface is inclined as indicated at 56. The latch 54 is adapted to be engaged by the triggering tip 37. On a resetting operation the inclined surface 56 of the latch 54 is adapted to contact the triggering tip 37 so as to swing it downwardly to be engaged under the latch 54.

On the latching member 21, positioned away from the latching extension 58, is a stop member 57 extending vertically. Opposite the latching extension 58 on the latching member 21 is an "opening" cam surface 59 and a "dwell" cam surface 60. The opening cam surface 59 is an arc of a circle, the center of which is located about .109 inch above and about .015 inch to the right of the center of the pivot shaft 53. The dwell cam surface 60 is likewise an arc of a circle having its center coincident with the center of the shaft 53. The dwell cam surface 60 thus is practically tangent to the opening cam surface 59 at the point of intersection thereof. Positioned inwardly of the dwell cam surface 60 is an arc-shaped slot 61 having an end wall 62 at one end thereof and another end wall 64 at the other end thereof, the angle between the walls 62 and 64 being somewhat greater than 90°, the bisector being at an angle of approximately 45° with the horizontal. While the latching member 21 may be made of any suitable material, it is preferably made of Monel metal.

The double yoke 22 and 23 is preferably made of brass but it may be made of Monel metal or any other suitable material and may be made in one piece, but for ease of fabrication it preferably is made in two parts. If made in two parts, the rear part 23 is viewed from FIGURE 6 is made with a right-angled portion 65 providing a flat surface for a purpose explained later. Each of the yoke parts 22 and 23 is of a generally inverted U shape, legs 66 being practically at right angles to the main body section 67 while ends 69 are turned outwardly at an angle of approximately 45°. At the end 66 yoke members are apertured and a pin 70 inserted therein, the ends of the pin being peened over to secure the pin in position and to secure the yoke parts 22 and 23 together. In addition, the pin 70 provides means to connect one end 71 of the spring to the yoke, other end 72 of the spring 24 being attached to a pin 74 extending from the inner wall of the housing 11.

In order to limit the downward movement of the flat surface 65 between the yokes 22 and 23 a sensitivity adjustment screw 75 (FIG. 6) is threadedly engaged in an aperture extending upwardly from the bottom of the housing 11. In order to provide a stop member or bumper for the latching member stop 57, a hollow boss 76 is made in the housing with a shoulder 77 about the passage therein to receive a bumper 79 which has a collar 80 adapted to be yielding held against the shoulder 77 by a spring 81 abutting against a screw member 82. The spring 81 is of a sufficient strength to absorb excess kinetic stored in the latching member 21.

The boss 15 (FIGS. 6 and 11) has a passageway 84 extending therethrough to receive the operating rod 25. The passageway 84 has a shoulder 85 against which abuts an enlarged portion 86 of the operating rod 25. The lower end of the rod 25 is sealed against upward passage of fluid pressure by conventional gasketing means 87. The housing 11 may be ventilated at one or more places 88 (FIG. 6).

In order to set the operating mechanism, a shaft 90 (FIGS. 2 and 11) is provided extending transversely across the housing and journalled in a rotatable bushing member 91 which extends outwardly from front wall 92 (FIG. 10) of the housing 11. The rotatable bushing member 91 is secured in position by a groove 93 (FIG. 11) thereabout to receive smooth end 93' of a screw 94 threadedly engaged in the wall of the housing as indicated at 95. A pin 96 extends from the inner end of the bushing member 91, the axis of the pin 96 being parallel with the axis of the bushing 91. The shaft 90 may have at its outer end a flattened portion 97, having an indicating arrow 98 on the end thereof, adapted to be engaged by a wrench or other tool for the rotation of the shaft 90 (FIG. 11).

At the inner end of the shaft 90 is a flange 99 having a pin 100 secured therein with its axis parallel to the axis of the shaft 90, the pin 100 being adapted to extend into the slot 61 (FIG. 6) of the latching member 21. The inner end of the shaft 90 is recessed as indicated at 101 (FIG. 11) to receive inner end 102 of the pivotal mounting means 53, which has a groove 104 adjacent the outer end thereof, the pivotal mounting means 53 being held in position by a set screw 105 extending into the groove 104.

In order to prevent overtravel of the yoke 22–23 when it is turned into the set position by the shaft 90, a pin 106 (FIG. 6) is positioned in one of the walls in the housing extending inwardly so that it is abutted by end 69 of the yoke member as the yoke member is moved into the set position.

Cable actuated trip means is provided in a compartment 108 (FIG. 10) formed on the housing 11 in front of the wall 92, the housing with the compartment 108 being cast integrally. In order to transform the cable pull to rotative movement, the rotatable bushing member 91 has extension arms 107 and 109 extending outwardly therefrom which may be made stampings having apertured rings 110 and 111 adapted to encircle the rotatable bushing member 91. The arms 107 and 109 may be held in position by a rivet pin 112. At the outer end of the arms 107 and 109 is a pin 114 which may have pivotally mounted thereon a conventional cable connector 113 for a cable 115, or alternatively, the cable 115 may be looped about the pin 114 and secured thereto. The cable 115 is adapted to extend through an opening 116 in the wall of the compartment 108, the opening being adapted to receive the threaded end of a conventional conduit system for a cable. A spring 118 engaged between an anchor post 118a and the arm 109 takes up any slack in cable 115.

Also carried by the arm 107 (FIG. 10) is an outwardly directed extension 119 carrying a spring 120 which may be secured to the extension 119 by riveting or other suitable means, outer end 121 of the spring 120 terminating short of the shaft 90. A pin 122 extends from the shaft 90 adapted to abut against the spring tip 121 so as to tend to rotate the shaft 90 in the clockwise direction, the purpose of the spring being to turn the shaft 90 so as to move the pin 100 (FIG. 6) away from the wall 62 of the slot 61 in the latching member 21. Another spring 124 (FIG. 10) is attached at one end 125 to a spring clip 126 secured into the inner wall of the compartment 108 by a screw 127, other end 129 of the spring 124 being attached to the shaft 90 by a screw or rivet 130. The purpose of the spring 124 is to tend to rotate the shaft 90 in the counter clockwise direction so that the pin 122 abuts the end of the spring tip 121. However, the spring 124 is made only sufficiently strong to rotate the shaft 90 to make contact between the pin 122 and the spring tip 121, but not strong enough to deflect the spring 120.

Figure 12:
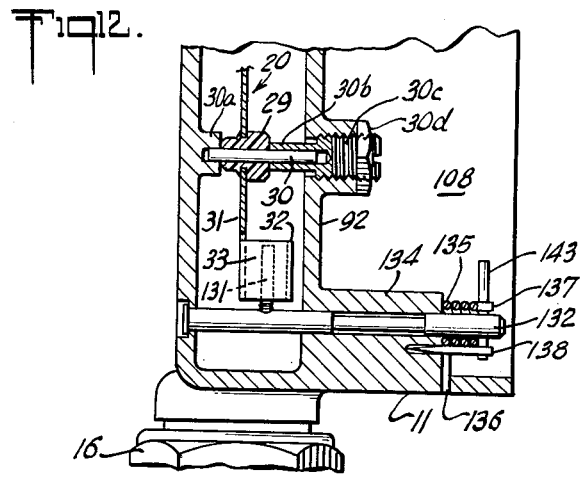
FIGURE 12 is a fragmentary view taken along the line 12—12 of FIGURE 9.

Manual tripping of the trigger 20 is achieved by a pin 131 (FIG. 12) extending upwardly from a shaft 132 journalled in a bearing 134, the shaft 132 extending through the wall 92 of the housing 11. The pin 131 is adapted to bear against the right angle portion 33 of the trigger member 20. To keep the pin 131 clear of the trigger member, a coil spring 135 is positioned about the shaft 132 with one end 136 abutting against the inner surface of the wall of the compartment 108 and with other end 137 of the spring 135 engaged with a pin 131. An anchor post 138 is provided as a stop.

In order to enhance the appearance of the device and to keep foreign matter from the compartment 108, a cover plate 140 (FIG. 2) is provided secured in position by a plurality of screws 141. Journalled in the cover plate is a pivot 142 for a push lever 144 having an outwardly turned flattened finger push portion 145. The lever 144 has a pin 146 extending inwardly through a slot 147 in the cover plate 140 into the compartment 108. The pin 146 (FIGS. 2 and 9) is of sufficient length so that it extends beyond a pin 143 of the manual tripping means. Thus, by rotating the manual lever 144 counter clockwise, the pin 131 is rotated about its pivot 132 to move the trigger 20 into the trip position.

In order to co-operate with the indicating arrow 98 (FIG. 2) on the end of the shaft 90 to indicate the set or released position of the control device, the cover 140 may have the word "Released" positioned as indicated at 148, and the word "Set" as indicated at 149. A direction arrow and the words "To reset" may also be positioned as indicated at 150.

A conventional locking pin 151 is inserted through apertures in the push lever 144 and the housing 140 so that the lever 144 may not be operated until after the removal of the locking pin 151. In order to provide an indication of tampering with the locking pin 150, a conventional sealing wire 152 with a seal 153 is engaged in a conventional manner between the manual operating lever 144 and the locking pin 151 in such a manner that the sealing wire 152 is ruptured in the event the locking pin 151 is moved from its position.

The construction so far described is of the control device 1 in accordance with the present invention, and actuation thereof as stated heretofore may be by pressure or mechanical means actuating the trigger member 20 to rotate it in the clockwise direction. Pressure operated means suitable for operation by a rate-of-rise indicator or by a conventional, explosive impulse is indicated generally at 14. The pressure operated device 14 is adapted to be attached to the top of the housing 11 over the trigger member 20, and includes a flexible diaphragm 161 (FIG. 6) which may have reinforcing means 162 and 164 attached on either side thereof and secured by rivets 165 to provide a solid surface for contact with the rounded end 27 of the trigger member 20.

The diaphragm 161 is secured in position at its edge by a casting 166 having a pressure connection fitting 167 at one end thereof. A fluid passage 169 is provided from the fitting 167 to space 170 between the casting 166 and the diaphragm 161. In order to vent the chamber 170 to take care of normal ambient temperature variations, venting means 171 (FIG. 6) is threadedly engaged in a fitting 172 having a fluid passage 174 providing fluid communication with the space 170. A conventional venting means may be used such as a plug 173 which generally includes a fiber glass or equivalent porous material 175 adjustably compressed by a screw 176 protected by a cap member 177. In order to enhance the appearance of the device, a cover member 178 may be secured over the casting 166 by a screw 179.

The operation of the control device 1 may perhaps most readily be understood by referring to the sectional view FIG. 7, which shows the mechanism in the tripped position in which stop 57 is abutting against the bumper 79. Setting of the device is achieved by rotating the flattened portion 98 (FIGS. 2 and 11) of the shaft 90 in the counter clockwise direction causing the pin 100 (FIG. 7) to abut against the wall 62 of the latching member 21; the latching member 21 is thereby rotated and the inclined surface 56 of the trigger member extension 35 is lifted so that the latching surface 55 engages against the trigger tip 37. As the latching member 21 is rotated in the counter clockwise direction, the pivot 51 draws the yoke 22 and 23 likewise in the counter clockwise direction tensioning the spring 24.

Upon the latching of the trigger member, the reset indicator 98 (FIG. 10) is in the "set" position, and the pin 106 (FIG. 6) prevents excessive travel of the yoke 22 and 23. Immediately upon the releasing of torsional force on the shaft 90, the spring 120 acts against the pin 122 so as to move the shaft 90 in the counter clockwise direction so that the pin 100 clears the wall 62 of the slot 61 of the latching member 21. If this feature were not provided, the pin 100 might remain in contact with the wall 192 and present sufficient frictional force so that dependable consistent tripping forces might not actuate the device. Likewise, the spring 124 (FIG. 10) prevents inadvertent excessive rotation of the shaft 90 so that the indicator 98 (FIG. 10) is directed towards the "set" indication as indicated on the cover member 140 (FIG. 2).

Now that the control device is in the set position, it may be tripped in any one of three ways, all of which cause a clockwise rotation of the trigger member 20.

Under manual operation a counter clockwise movement of the push lever 144 (FIG. 2) causes counter clockwise rotation of the pin 131 (FIGS. 7 and 12) which contacts the offset 32 of the trigger member 20 causing a clockwise rotation thereof. Under cable operation a pull on the cable 115 (FIG. 10) causes a clockwise rotation of the rotatable bushing 91 so that the pin 96 (FIG. 6) abuts against the end 34 of the offset portion 32 likewise causing clockwise rotaton of the trigger 20.

Under pressure operation, a buildup of pressure in the space 170 of the pressure actuated device 160 causes the diaphragm 161 to move downwardly and contact tip 27 of the trigger member 20, causing its clockwise rotation. Irrespective of the cause of operation, the trigger member 20 is always rotated in the clockwise direction so that the trigger tip 37 is moved downwardly to be disengaged from the latch 54 allowing the latching member 21 to be roated clockwise by the spring 24. At the start of the rotation of the latching member 21, the effective pull of the spring 24 is not too great, but as the pivot 51 moves upwardly and around, the effective force of the spring 24 becomes greater. Meanwhile, because of its rotation, the static energy of the spring 24 is being transformed into the kinetic energy of the latching member 21.

Upon a predetermined degree of rotation of the latching member 21 the start of the cam surface 59 contacts the end of the operating member 25. At this point the latching member 21 is moving at a high rate of speed and has acquired considerable kinetic energy. By reason of the shape of the cam surface 59, the operating member 25 is suddenly and vigorously depressed with ample force to unseat a valve member or provide any other desired mechanical operation. The latching member 21 continues its rotation until the cam dwell portion 60 has reached the end of the operating member 25. Any excessive stored kinetic energy in the latching member 21 is dissipated by contact of its stop 57 with the bumper 79.

The theory of operation and the means for providing a dependable and consistent tripping setting of the control device 1 may be understood by referring to the schematic showing of FIGURE 8. It should be noted that when in the set position, the device has a trigger action in which the toggle center line extends from the end support 74 of the spring 24 to the pivot 51 attaching the yoke 22 to the latching member 21. A desired sensitivity adjustment is made by the setting of the sensitivity screw 75 and the pressure setting adjusting screw 46. Inward movement of the screw 75 moves the pivot 70 upwardly away from the toggle center line and makes the device more sensitive in that there is a greater force tending to rotate the latching member 52. Obviously, if the screw 75 where retracted so that the pivot 70 was exactly in the toggle center line, there would be no force tending to trip the latching member.

The adjusting screw 46 varies the tension on the spring 40 and thus effects the force tending to rotate the trigger member in the clockwise direction thereby providing a stronger holding force against the latch 54. In a preferred adjustment of the device, the screws 46 and 75 are set so that when rotated into the set position, engagement is had, the sensitivity screw 75 being first adjusted and the pressure setting screw 46 next adjusted.

The force moments may be explained by considering a pressure applied to the diaphragm 161 as producing a moment $F_A A$ which is greater than the moment $F_B B$. The force $F_B$ being the frictional force opposing disengagement of the latch 54 from the trigger tip 37 and which is produced by the force $F_C$ induced by the spring 24 which exerts a force $F_S$ through the moment arm S tending to rotate the latching member with its cam.

Thus, by the arrangement of the arms and the proportions thereof, we have achieved a determinable value of $F_B$ in terms of $F_A$ which is in terms of pneumatic pressure. The magnitude of motion at the latch has been appreciably reduced as compared to the motion of the diaphragm being the proportion of the ratio of B/A.

Because of the stored energy in the spring, the latching member 21, with its cam surfaces 59 and 60, is rapidly accelerated rotationally transferring the static energy of the spring 24 into its own kinetic energy of momentum which is utilized in moving the operating rod 25 by contact of the cam surfaces thereagainst. After the operating member 25 is moved outwardly, the dwell portion 60 of the cam bears against the end thereof, holding it in locked open position. Because of the dwell action used in which the cam surface 60 is a circular arc having the same center as that of the pivot 51, the locking action continues even though there were not enough residual force in the spring 24 to prevent counter clockwise rotation of the latching member 21 and release of the operating rod 25. However, in the interests of dependability of operation under temperature changes, it is desirable to overdesign the spring 24 to assure a surplus of static energy available for activation of the operating rod 25. An excess of energy not required for moving the operating rod 25 might cause damage or excessive wear to the moving parts; this condition, however, is prevented by the abutment of the stop 57 against the bumper 79 which absorbs any such excess energy in the spring 81. The action of the stop against the bumper takes place only after the cam surface has been turned so that its dwell position is holding the operating rod in the opened position.

The construction in accordance with the invention is such that irrespective of normal tolerance variations occasioned by production in accuracies, compensatory adjustments are quickly and easily made by the sensitivity and adjusting screws to achieve even better consistency of the final adjustment than would be possible in the best precision construction without the compensatory features. For example, one might at random select twenty or more of the control heads as fabricated according to the teaching herein and, after being adjusted, all would be of substantially equal sensitivity.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

We claim:

1. A control device comprising a housing, a spring carried by the housing, latching means for the spring, trigger means cooperating with the latching means and operative to release the spring, an operating member, and a cam member rotatable by the spring to store kinetic energy, the surface of the cam curved and adapted to be rotated against the end of the operating member to utilize the kinetic energy for the movement thereof.

2. A control device comprising a housing, a spring carried by the housing, latching means for the spring, trigger means cooperating with the latching means and operative to release the spring, an operating member, and a cam member rotatable by the spring to store kinetic energy, the surface of the cam adapted to rotate against the end of the operating member to utilize the kinetic energy for the movement thereof, at rest position the cam spaced from the operating rod, the cam operating surface comprising a segment of a circle having its center offset from the pivot point of the cam, and the cam having a dwell shaped as a circular surface with its center at the pivot point of the cam.

3. A control device comprising a housing, a tension spring attached at one end to the housing, a yoke member attached to the other end of the spring, a latching member having a cam surface, pivot mounting means for the latching member, pivot means securing the yoke member to the latching member, a pivotably mounting trigger member releasably engaging the latching member, an operating member, the spring when tensioned tending to swing the latching member about its pivot mounting means so that the cam surface slides against the operating member, the ends of the spring, the pivotable mounting for the latching member and the pivot means securing the yoke member to the latching member, all practically in alignment when the spring is tensioned thereby providing a toggle construction.

4. A control device comprising a housing, a tension spring attached at one end to the housing, a yoke member attached to the other end of the spring, a latching member having a cam surface, pivot mounting means for the latching member, pivot means securing the yoke member to the latching member, a pivotably mounted trigger member releasably engaging the latching member, an operating member, the spring when tensioned tending to swing the latching member about its pivot mounting means so that the cam surface slides against the operating member, the ends of the spring, the pivotable mounting for the latching member and the pivot means securing the yoke member to the latching member, all practically in alignment when the spring is tensioned thereby providing a toggle construction, and an adjustment member adapted to adjustably bear against the yoke member adjacent said other end of the spring.

5. A control device comprising a housing, a tension spring attached at one end to the housing, a yoke member attached to the other end of the spring, a latching member having a cam surface, pivot mounting means for the latching member, pivot means securing the yoke member to the latching member, a pivotably mounted trigger member releasably engaging the latching member, an operating member, the spring when tensioned tending to swing the latching member about its pivot mounting means so that the cam surface slides against the operating member, the ends of the spring, the pivotable mounting for the latching member and the pivot means securing the yoke member to the latching member, all practically in alignment when the spring is tensioned thereby providing a toggle construction, an adjustment member adapted to adjustably bear against the yoke member adjacent said other end of the spring, and resilient stop means adapted to engage the latching member when it is in the latched position.

6. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, the latching extension adapted to swing in an arc of approximately ninety degrees, a cam surface for the latching member, the cam surface of circular shape with its center point offset from the center of the shaft for the latching member, the cam surface having a dwell portion of circular shape with its center coinciding with the center of the shaft for the latching member, a trigger member, a shaft for the trigger member, counterbalance means for the trigger member, an extension for the trigger member adapted to releasably engage the latching member extension, the latching member having a slot, and resetting means including a crank pin to engage the wall of the slot, a bushing member carrying the crank pin and overlying the shaft for the latching member, manual rotating means for the crank pin bushing, a crank neutralizing spring to move the crank pin away from the wall of the slot, indicia carried by the manual rotating means, and a balancing spring operative to urge the crank pin towards the slot wall so that the indicia shows the position thereof, whereby the latching member may be rotated to tension the spring and engage the trigger and latching member extensions.

7. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, a cam surface for the latching member, the cam surface of circular shape with its center point offset from the center of the shaft for the latching member, the cam surface having a dwell portion of circular shape, the center thereof coinciding with the center of the shaft for the latching member, a trigger member, a shaft for the trigger member, counterbalance means for the trigger member, an extension for the trigger member adapted to releasably engage the latching member extension, the latching member having a slot, and resetting means including a crank pin to engage the wall of the slot, a bushing member overlying the shaft for the latching member, manual resetting means for the crank pin bushing, a crank neutralizing spring to move the crank pin away from the wall of the slot, indicia carried by the manual rotating means, and a balancing spring operative to urge the crank pin towards the slot wall so that the indicia shows the position thereof, whereby the latching member may be rotated to tension the spring and engage the trigger and latching member extensions.

8. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, a cam surface for the latching member, the cam surface of circular shape with its center point offset from the center of the shaft for the latching member, the cam surface having a dwell portion of circular shape, the center thereof coinciding with the center of the shaft for the latching member, a trigger member, a shaft for the trigger member, counterbalance means for the trigger member, and an extension for the trigger member adapted to releasably engage the latching member extension.

9. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, a cam surface for the latching member, the cam surface of circular shape with its center point offset from the center of the shaft for the latching member, the cam surface having a dwell portion of circular shape, the center thereof coinciding with the center of the shaft for the latching member, a trigger member, a shaft for the trigger member, counterbalance means for the trigger member, an extension for the trigger member adapted to releasably engage the latching member extension, the latching member having a slot, resetting means including a crank pin to engage the wall of the slot, manual rotating means for the resetting means, a bushing member overlying the shaft for the latching member, a crank neutralizing spring to move the crank pin away from the wall of the slot, indicia carried by the manual rotating means, and a balancing spring operative to urge the crank pin towards the slot wall so that the indicia shows the position thereof, whereby the latching member may be rotated to tension the spring and engage the trigger and latching member extensions.

10. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, a cam surface for the latching member, the cam surface of circular shape with its center point offset from the center of the shaft for the latching member, the cam surface having a dwell portion of circular shape, the center thereof coinciding with the center of the shaft for the latching member, a trigger member, a shaft for the trigger member, counterbalance means for the trigger member, an extension for the trigger member adapted to releasably engage the latching member extension, the latching member having a slot, resetting means including a crank pin to engage the wall of the slot, manual rotating means for the resetting means, a bushing member overlying the shaft for the latching member, manual resetting means for the crank pin bushing, indicia carried by the manual rotating means, and a balancing spring operative to urge the crank pin towards the slot wall so that the indicia shows the position thereof, whereby the latching member may be rotated to tension the spring and engage the trigger and latching member extensions.

11. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, a cam surface for the latching member, the cam surface of circular shape with its center point offset from the center of the shaft for the latching member, the cam surface having a dwell portion of circular shape, the center thereof coinciding with the center of the shaft for the latching member, a trigger member, a shaft for the trigger member, counterbalance means for the trigger member, an extension for the trigger member adapted to releasably engage the latching member extension, the latching member having a slot, and resetting means including a crank pin to engage the wall of the slot, manual rotating means for the resetting means, a bushing member overlying the shaft for the latching member, manual resetting means for the crank pin bushing, a crank neutralizing spring to move the crank pin away from the wall of the slot, and indicia carried by the manual rotating means so that the indicia shows the position thereof, whereby the latching member may be rotated to tension the spring and engage the trigger and latching member extensions.

12. A pressure operated control device comprising a housing, pressure operated means carried by the housing at the top thereof, a tension spring horizontally positioned within the housing and attached at one end thereto, a yoke member attached at one end to the other end of the spring, a latching member, a shaft for the latching member, yoke member pivot means securing the yoke member to the latching member, an upwardly directed latching extension for the latching member, a cam surface for the latching member, the cam surface of circular shape with its center point offset from the center of the shaft for the latching member, the cam surface having a dwell portion of circular shape, the center thereof coinciding with the center of the shaft for the latching member, a trigger member, a shaft for the trigger member, counterbalance means for the trigger member, an extension for the trigger member adapted to releasably engage the latching member extension, the latching member having a slot, resetting means including a crank pin to engage the wall of the slot, a bushing member overlying the shaft for the latching member, manual resetting means for the crank pin bushing, a crank neutralizing spring to move the crank pin away from the wall of the slot, and a balancing spring operative to urge the crank pin towards the slot wall, whereby the latching member may be rotated to tension the spring and engage the trigger and latching member extensions.

References Cited in the file of this patent

UNITED STATES PATENTS

| | | |
|---|---|---|
| 1,414,714 | Sutliff | May 2, 1922 |
| 1,881,807 | Maurer | Oct. 11, 1932 |
| 2,333,130 | Thomsen | Nov. 2, 1943 |
| 2,351,607 | Grant | June 20, 1944 |
| 2,375,721 | Woodhull | May 8, 1945 |
| 2,466,750 | Thomsen | Apr. 12, 1949 |
| 2,532,510 | Nelson | Dec. 5, 1950 |
| 2,664,755 | Kiel | Jan. 5, 1954 |